US008201108B2

(12) United States Patent  
Chen et al.

(10) Patent No.: US 8,201,108 B2  
(45) Date of Patent: Jun. 12, 2012

(54) AUTOMATIC COMMUNICATION NOTIFICATION AND ANSWERING METHOD IN COMMUNICATION CORRESPONDANCE

(75) Inventors: Milton Chen, San Jose, CA (US); Benjamin Mowery, Palo Alto, CA (US); Erika Shuching Chuang, Los Gatos, CA (US); Hrishikesh Ramesh Deshpande, Pacifica, CA (US)

(73) Assignee: VSee Lab, LLC, San Jose, CA (US)

( * ) Notice: Subject to any disclaimer, the term of this patent is extended or adjusted under 35 U.S.C. 154(b) by 994 days.

(21) Appl. No.: 11/906,547

(22) Filed: Oct. 1, 2007

(65) Prior Publication Data

US 2009/0089716 A1    Apr. 2, 2009

(51) Int. Cl.  
*G06F 3/033* (2006.01)

(52) U.S. Cl. .................................... 715/863; 715/753

(58) Field of Classification Search ................. 715/751, 715/753, 748, 863  
See application file for complete search history.

(56) References Cited

U.S. PATENT DOCUMENTS

| 562,143 | A | 4/1997 | Marsh |
| 568,061 | A | 10/1997 | Gudmundson et al. |
| 572,459 | A | 3/1998 | Gentner |
| 589,431 | A | 4/1999 | Arsenault et al. |
| 596,970 | A | 10/1999 | Walls |
| 646,276 | A1 | 10/2002 | Cox, Jr. et al. |
| 661,796 | A1 | 9/2003 | Tu et al. |
| 694,512 | A1 | 9/2005 | Toratani et al. |
| 724,242 | A1 | 7/2007 | Center, Jr. et al. |
| 7,418,497 | B2 * | 8/2008 | Hagale et al. ................. 709/224 |
| 7,603,413 | B1 * | 10/2009 | Herold et al. ................. 709/204 |
| 2002/0167488 | A1 * | 11/2002 | Hinckley et al. .............. 345/156 |
| 2004/0027383 | A1 * | 2/2004 | Jaeger ........................... 345/769 |
| 2004/0189720 | A1 * | 9/2004 | Wilson et al. ................. 345/863 |
| 2005/0055639 | A1 * | 3/2005 | Fogg ............................. 715/535 |
| 2006/0005142 | A1 * | 1/2006 | Karstens ....................... 715/767 |
| 2006/0265651 | A1 * | 11/2006 | Buck ............................. 715/700 |
| 2008/0244465 | A1 * | 10/2008 | Kongqiao et al. ............ 715/863 |

OTHER PUBLICATIONS

Palmer, S.M. and Rosa, M.G.P. "A Distinct Anatomical Network of Cortical Areas for Analysis of Motion in Far Peripheral Vision," pp. 2389-2405, European Journal of Neuroscience, vol. 24, 2006.

* cited by examiner

*Primary Examiner* — Omar Abdul-Ali  
(74) *Attorney, Agent, or Firm* — Patterson & Sheridan, LLP

(57) ABSTRACT

A communication correspondence notification and reply method is provided. The method is implemented as a software program with the objective to be less distractive and to increase work productivity compared to prior methods. In particular, a notification format for incoming communication correspondences is determined, without any guidance/input from the user, taking into account (i) monitored user activity and (ii) the type of incoming correspondence, i.e. the notification format is a function of tracked/monitored user activity and the message type with the objective to minimize distraction to the user. To further minimize user distraction, the software program determines an area on the display of the computer system where the incoming correspondence can be presented to the user. Once presented, the user then has the ability to reply with minimal effort by making a pointer-device gesture movement in reply to the presented notification.

8 Claims, 4 Drawing Sheets

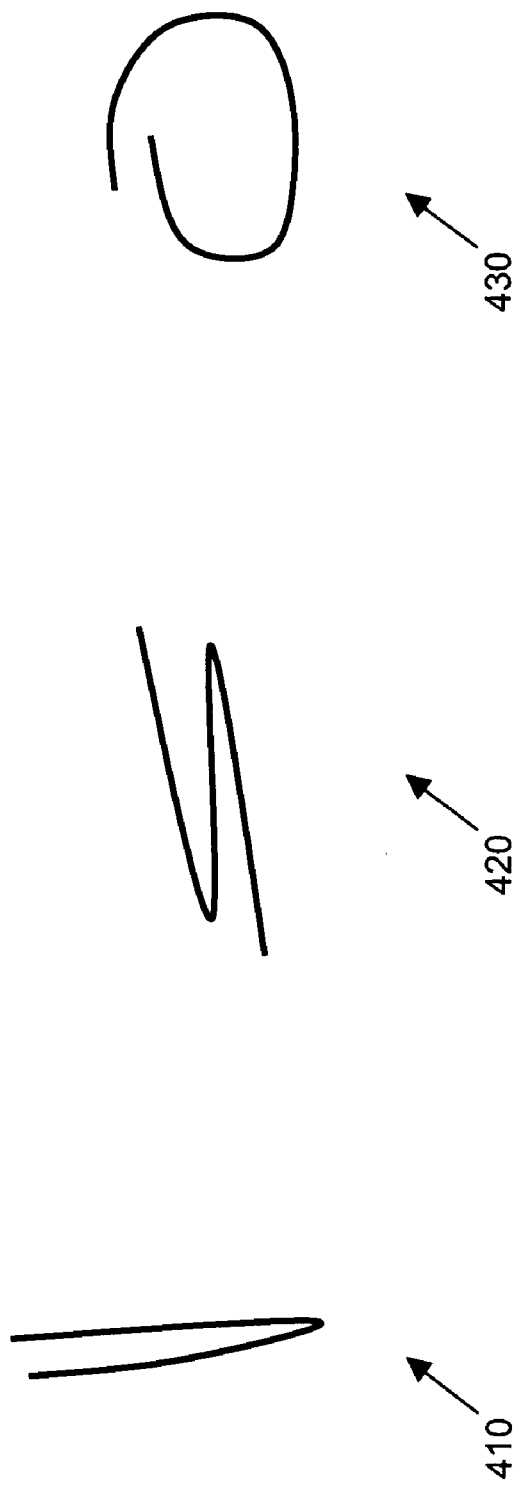

AUTOMATIC COMMUNICATION NOTIFICATION AND ANSWERING METHOD IN COMMUNICATION CORRESPONDANCE

FIELD OF THE INVENTION

The invention relates generally to communication notifications methods and systems. More particularly, the present invention relates to methods and systems for notifying a user of a computer system of incoming correspondence while minimizing the distraction to the user related to the notification of such incoming correspondence. The present invention further relates to methods to minimize the effort and distraction to a user on how to handle an incoming notification.

BACKGROUND OF THE INVENTION

Software for communications such as video, audio or web conferencing, email and instant messaging, all include methods for notifying users of incoming calls and messages. These notifications, such as sound alerts, pop-up windows and/or blinking icons, are predefined and lack any flexibility to user's activity.

On the one hand, however, notifications are helpful to the user. On the other hand, however, such notifications, according to current practice, interfere and interrupt the user's current activity, especially when the number of corresponding communication systems linked to the computer increases. With incoming notifications, users are forced to change their attention from the area where they are working to a different window or area typically to the edge of the computer display to find out what the incoming correspondence is about. Such distractions are not only time consuming, they also require time, sometimes in the minutes, for users to switch their mental focus back-and-forth between the area where they were working or viewing and the area where the notifications was displayed. In addition, notifications appearing in a user's peripheral vision appear to be much more distractive due to the fact that peripheral vision is more sensitive to motion than the central area of vision (e.g. Palmer et al. (2006) entitled "*A distinct anatomical network of cortical areas for analysis of motion in far peripheral vision*" and published in Eur. J. Neuroscience 24(8):2389-2405). The present invention addresses these problems and advances the art by at least providing notification and reply solutions that are less distractive to users and increase work productivity.

SUMMARY OF THE INVENTION

A communication correspondence notification and reply method is provided that is less distractive to users and increases work productivity compared to prior methods. The method is implemented as a software program on a computer system of a user. The software program includes several steps that are all accomplished in an automatic fashion without any user's guidance, except of course from the reply to the presented notification.

User activity on the computer system is monitored based on a plurality of input or tracking devices. Again the monitoring is accomplished automatically by the software program and without any guidance or input from the user. The software program receives an incoming conferencing correspondence from a conferencing system, upon which the program classifies the type of received incoming conferencing correspondence. Furthermore, a notification format is determined, again without any guidance or input from the user, whereby the notification format for the incoming conferencing correspondence takes into account (i) monitored user activity and (ii) the classified type of incoming conferencing correspondence. In other words, the notification format is a function of tracked/monitored user activity and the message type with the objective to minimize distraction to the user.

To further minimize distraction to the user, the software program determines an area on the display of the computer system where the incoming correspondence in the determined notification format can be presented to the user. Here it is important that the determined area avoids that the user has to switch over to another window on the computer display. In particular, the determined area is determined to be within or near central the field of view of the user on the display or within the workspace area where the user is working or looking on the display.

Once the display area is determined, the incoming correspondence in its determined notification format is presented to the user. The user then has the ability to reply, with minimal effort, by making a pointer-device gesture movement in reply to the presented notification. The gesture is selected from a predefined set of pointer-device gesture combinations such as an accept gesture, a decline gesture, a hold gesture, or any combination thereof.

When presenting the notification it is sometimes desirable to morph the shape of the icon on the display to e.g. reflect the type of incoming correspondence. In some cases it is desirable to have a degree of morphing which could be determined by weighting input from the user of the computer system, input from processes on the computer system, activities handled by the user of the computer system, or any combination thereof. In other cases it is important to delay the presentation of the notification to the user to avoid disruption of user's activities. Again, the amount or type of delay could be determined by weighting input set by the user of the computer system, input from processes on the computer system, activities handled by the user of the computer system, or any combination thereof.

BRIEF DESCRIPTION OF THE FIGURES

The present invention together with its objectives and advantages will be understood by reading the following description in conjunction with the drawings, in which:

FIG. 2 is an example of a user typing in an application. Here the best area for display was determined around the area where the cursor (I)is located or blinking. FIG. 3 is an example of having two applications open, but the user is actually viewing and scrolling the mouse on the desktop where the icons are displayed. In this case the best area for display was determined around the mouse or pointer.

FIG. 4 shows examples of gestures (mouse, pointer, head, eye, or the like) to reply to an incoming correspondence according to the present invention.

DETAILED DESCRIPTION OF THE INVENTION

Figure 1:
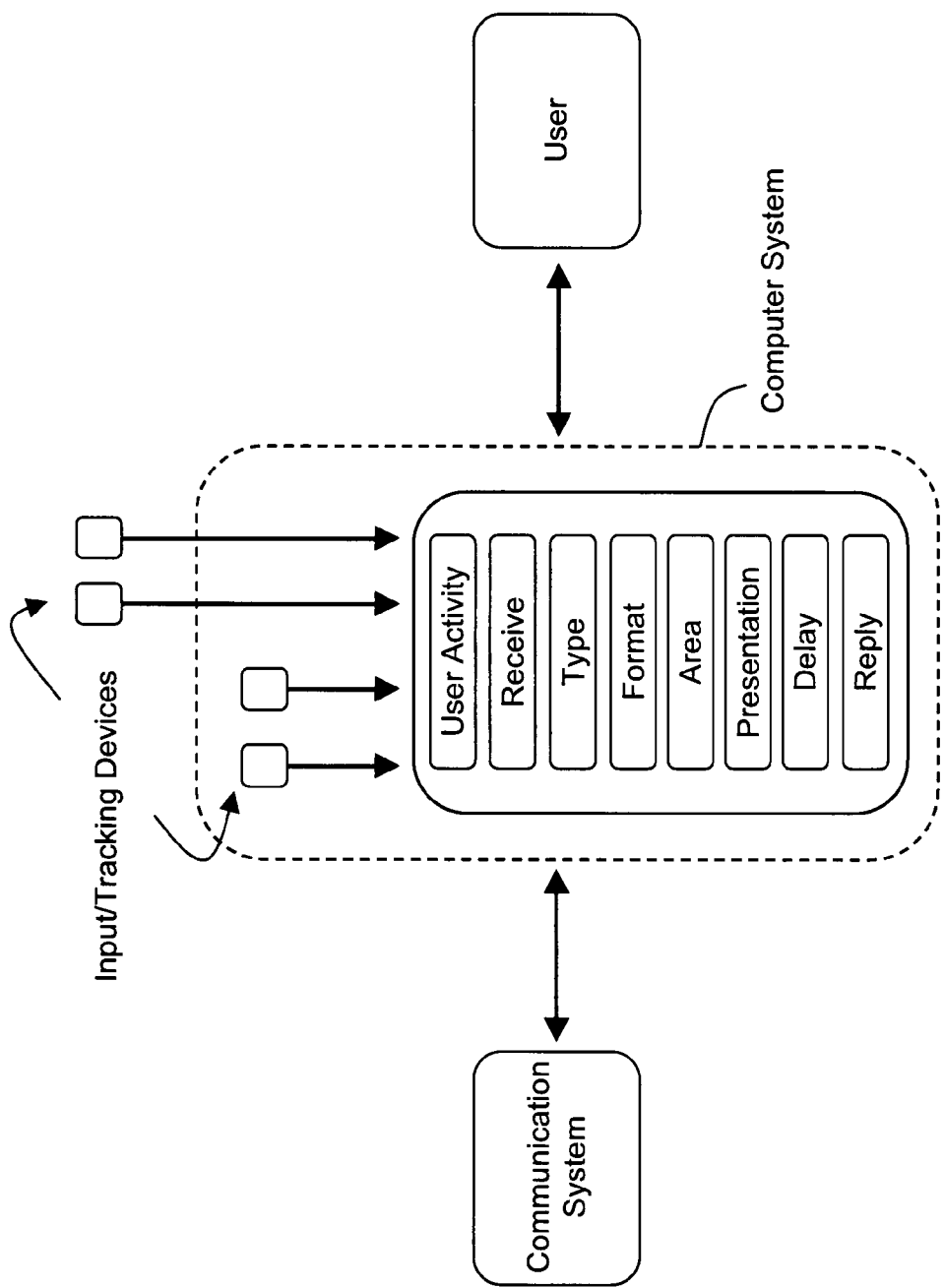
FIG. 1 shows an overview of the communication notification method and system according to the present invention.

A user of a computer system is networked with one or more communication systems such as web/video/audio conferencing, email, instant messaging, or the like. The communication systems send correspondence, notifications or messages to the computer system to communicate with the user of the computer system. The computer system could be any type of computer with a mouse or track-pad, keyboard and any other input or tracking devices either integrated with the computer system or attached to the computer system (FIG. 1). The computer system preferably includes a software program and/or a plurality of modules that encompasses the steps of the communication notification and reply method of the invention (FIG. 1). The following description discusses these steps.

User's activity on the computer system is monitored using a plurality of input or tracking devices. Examples of input or tracking devices useful for the invention are a mouse or a trackpad, a keyboard, a camera, eye-gaze system, motion detected, microphone, or any other device that could provide input regarding the activities of the user. The state and data from each of the input/tracking device is monitored to collect information and clues of user's activity and presence. For example, the data could be images, eye-gaze data, motion data, sound, the layout or content of the window displayed on the display, software application and/or computer processes indicating user's activity, or the like.

Activities that are useful to know are, for example, user's level of interaction with a software application, user's level of activity in browsing the desktop e.g. looking for information, user's activity in moving the mouse over the screen, user's level of activity in engaging in a conference or listening to audio, etc. These activities could be determined, for example, by active keyboard inputs, which indicate user activities involving word processing or emailing, or active mouse motion, which suggests that the user is engaged in navigation or browsing. Together with first level cues such as which application window(s) is(are) active or visible, the CPU and network usage, a more detailed information gathered by auxiliary devices such as output from eye-gaze tracker, which tells precisely the coordinate on the screen where the user is looking, user's activity can easily be classified into informative categories.

Information about the user's activity is important for analyzing how best to minimize disturbance to the user and also determine what, how and when to present incoming correspondence to the user. Furthermore, this information is useful to determine the area on the display where the correspondence should be best displayed and presented to the user.

Incoming correspondence from one or more communication systems is received by the computer system. The incoming correspondence could be from different sources hence having different types of correspondence. For example, messages could range from video, audio, web, email, instant messages, etc., all depending on the type of communication system.

A notification format for each incoming correspondence is determined and takes into account the analyzed user's (current) activity and the type of the incoming correspondence. It is noted that this approach is different from prior approaches, since the notification format is now a function of the analyzed user's (current) activity and the type of the incoming correspondence, and not simply a one-to-one mapping of incoming information and notification. For example, according to the present invention, when the user is actively engaged in a conversation, a program, video conference, or web browsing, the incoming correspondence can be displayed in a gentle and gradual manner to capture user's attention but does not jump right in from of the screen to demand immediate attention. In another example, when the user is away from the computer system, the incoming correspondence could be a loud and clear audio message to get an immediate response. In yet another example, when the user is idle or away the incoming message could be flashing, displayed in a window or presented as an alerting/repeating sound, all of which alert the user when he/she is back and ready to engage with the work on the computer system. In still another example, when the user is busy, the display of the incoming message can be delayed until the user has finished the activity or when there is a more appropriate time (e.g. finished typing a sentence, stops speaking, changing direction of eyes, finishes a presentation, changing scene in a movie, etc).

Figure 2:
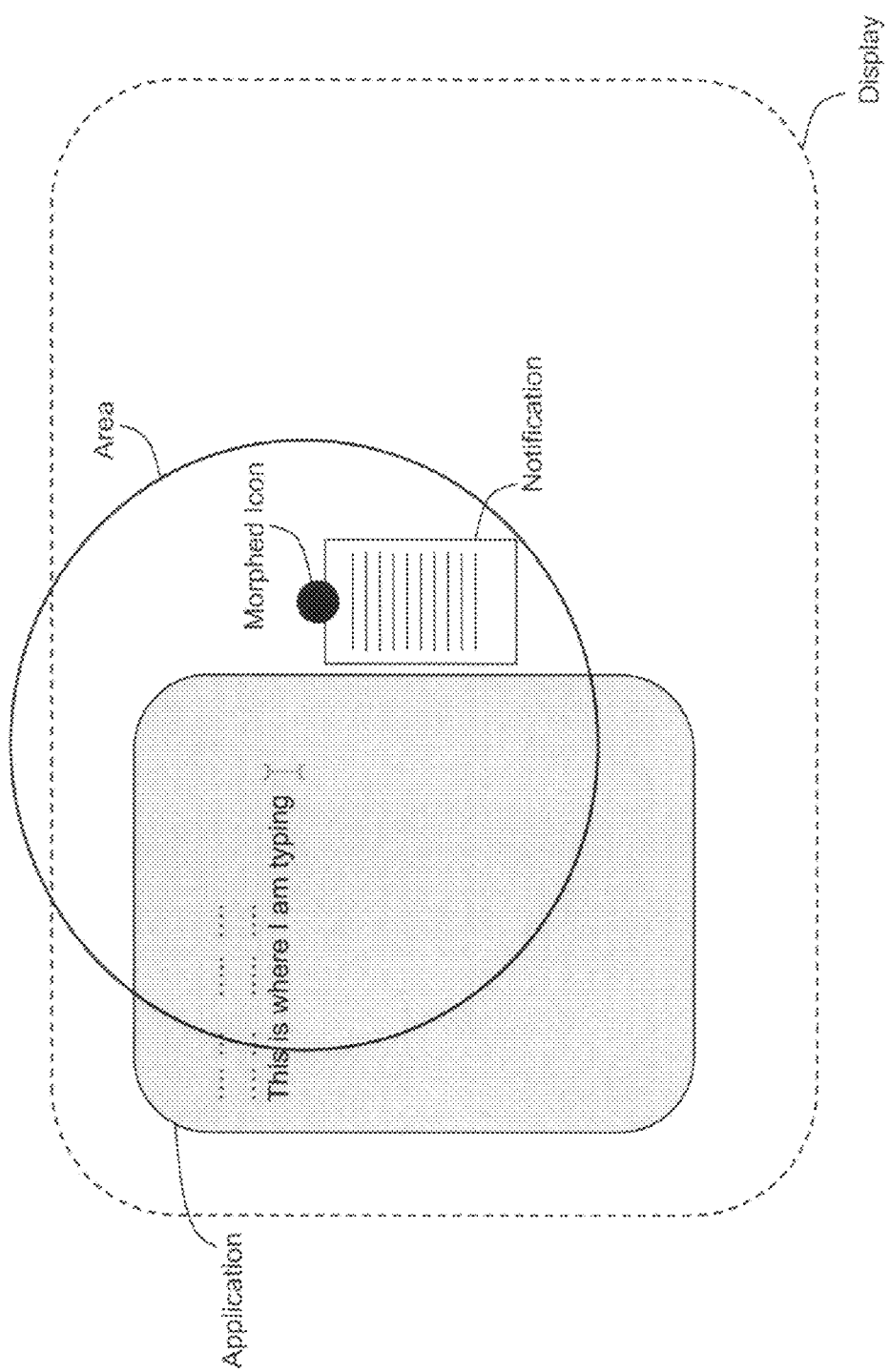
FIGS. 2-3 show examples of presenting incoming correspondence to a user according to the present invention.
Figure 3:
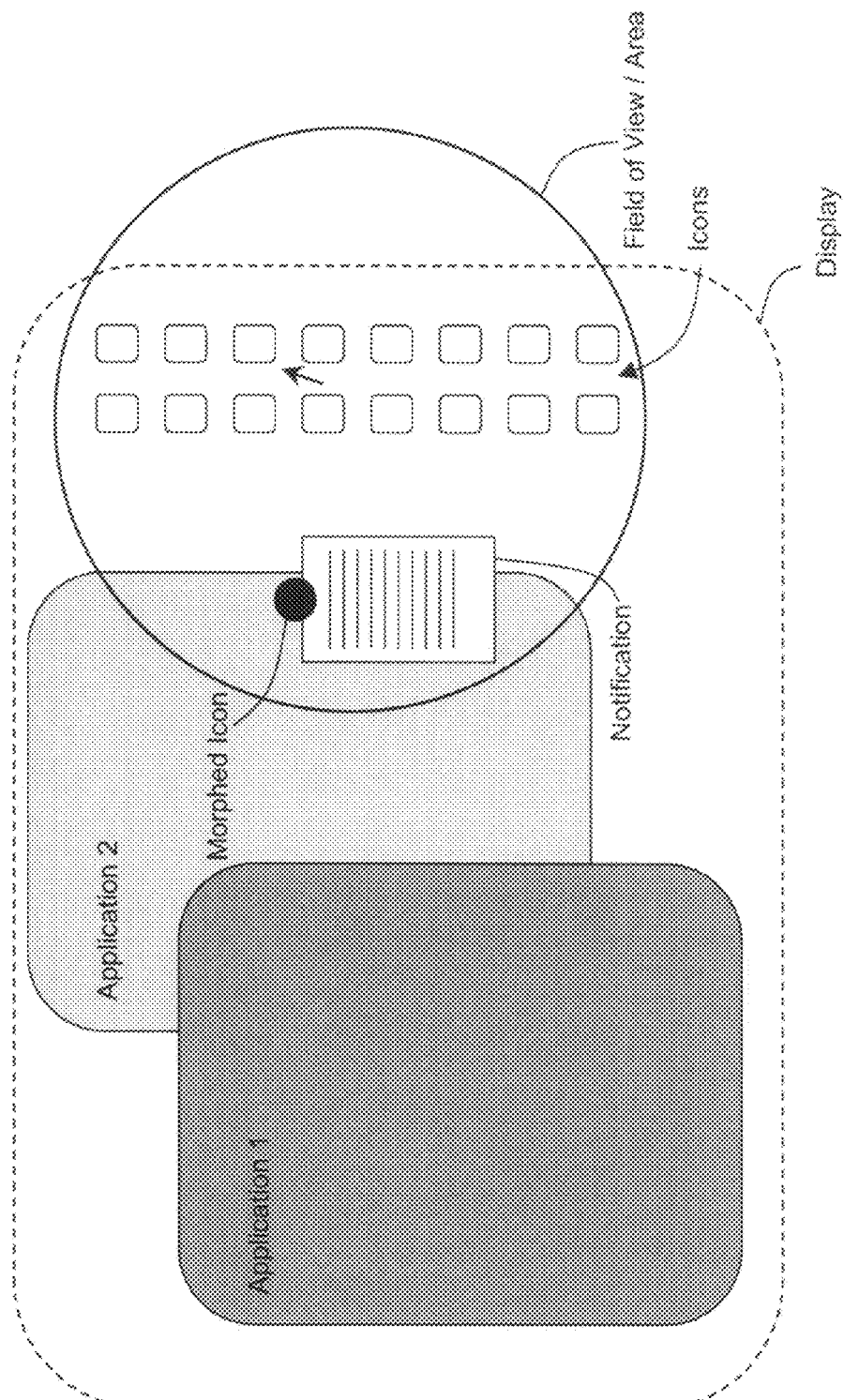

An important aspect of the invention is the determination of the best area for display of the notification on the display rather than in a predefined place or window as is common is prior approaches. The goal in determining the best area for display is to find the area or window where the user is active, i.e. working, looking, or moving to. This can be determined using the various input and tracking modalities as indicated supra. A further goal is to find the area that is within the field of view of the user at the display, i.e. not in the peripheral vision but closer to the central part of the user's area of vision. The main objective here is to avoid saccadic eye movements that are triggered by notifications in the peripheral vision. The incoming correspondence in its determined notification format is then displayed within or near, but preferably within, the determined area (see FIGS. 2-3).

The notification format could take different styles depending on the type of incoming communication. The objective here is to distill the most important information (e.g. caller ID, subject, level of importance, etc.) for display in combination with new or changing icons, image(s), audio or the like. In one aspect of the notification format, the shape of the icon or cursor that is shown on the display could be changed or morphed to indicate an incoming correspondence. One could change the present icon or one could present a new icon on the display, preferably within the determined area. The new or morphed icon also preferably represents the type of incoming correspondence. For example, if the incoming message is a video conference call the icon could represent that video call. If the incoming message is an email or instant message the icon could display the person sending the message. Other variations, are morphing the cursor or icon into a text string, a picture, a pre-recorded video/message, or a live video of the caller or other predefined items.

The degree of morphing or style of morphed icon could also be determined by weighting input from the user of the computer system, input from processes on the computer system, activities handled by the user of the computer system, or any combination thereof. For example, if the user is typing, it is critical that the morphed icon does not occlude the text the user is actively working on. Techniques involving placing the morphed icon near the white margin, applying semitransparent, alpha blended images are important. In another example, if the user is busy moving the mouse during browsing or navigation, the morphed icon may gradually replace the cursor to obtain the user's attention. However, since the icon is moving, it is impossible for the user to read any textual information. An easily recognized image may be sufficient to capture the user's attention. If the user proceeds to stop the mouse motion, it may be appropriate then to display the texture information accompanying the incoming communication message. The shape of the icon could also reflect other information or details regarding the incoming message such as a three-dimensional rendered icon that appears to float on the surface of the screen indicating an urgent message, while a normal flat icon works for normal messages.

As indicated supra the display of the incoming correspondence could be delayed to again find a better time to present the information, i.e. minimizing the disruption of the notification display. To achieve that objective, the amount of delay could be best determined based on weighting input from the user, input from processes occurring on the computer system, activities handled by the user of the computer system, or any combination thereof.

Once the notification is display or presented to the user in the determined area, the invention further includes the step to reply to the sender. This is accomplished by having a set of gesture-reply combinations, whereby the gesture can either be generated by the mouse/pointer on the screen or head/eye/hand movements. FIG. 4 shows three examples of replies 410, 420 and 430. Reply 410 could be a signal to accept an incoming correspondence or call, reply 420 could be a signal to ignore or decline an incoming correspondence or call, and reply 430 could be a signal to place the incoming correspondence or call on hold. Other variations or types of replies could be envisioned as a person of average skill in the art would readily appreciate.

The present invention has now been described in accordance with several exemplary embodiments, which are intended to be illustrative in all aspects, rather than restrictive. Thus, the present invention is capable of many variations in detailed implementation either in hardware and/or software, which may be derived from the description contained herein by a person of ordinary skill in the art. For example, variations involving the gathering of different types of input data for determining the user activities, variations involving the styles and the locations to display the incoming messages, and variations involving the modalities for generating input gestures for replying. All such variations are considered to be within the scope and spirit of the present invention as defined by the following claims and their legal equivalents.

What is claimed is:

1. A conferencing communication notification and reply method to notify a user of a computer system of an incoming conferencing correspondence from a conferencing system that is networked with said computer system and said user replying to said notification, said communication notification and reply method is implemented as a software program on said computer system, wherein said software program comprises the method steps of:
   (a) monitoring user activity on said computer system based on a plurality of input or tracking devices, wherein said monitoring is accomplished automatically by said software program and without any guidance or input from the user;
   (b) receiving said incoming conferencing correspondence from said conferencing system;
   (c) classifying the type of said received incoming conferencing correspondence;
   (d) determining, without any guidance or input from the user, a notification format for said incoming conferencing correspondence by taking into account said monitored user activity and said classified type of said incoming conferencing correspondence;
   (e) determining an area on a display of said computer system where said incoming conferencing correspondence in said notification format can be presented to said user, wherein said determined area avoids said user to have to switch over to another window on said display and wherein said determined area is within or near a central field of view of said user on said display or within a workspace area where said user is working or looking on said display;
   (f) presenting said incoming conferencing correspondence in said determined notification format to said user;
   (g) detecting a pointer-device gesture movement that is included in a predefined set of pointer-device gesture combinations; and
   (h) generating a reply based on said detecting.

2. The method as set forth in claim 1, wherein said set of predefined pointer-device gesture combinations comprises an accept gesture, a decline gesture, a hold gesture, or any combination thereof.

3. The method as set forth in claim 1, further comprising morphing a shape of an icon on the display of said computer system when presenting said incoming conferencing correspondence to said user.

4. The method as set forth in claim 3, wherein said morphing the shape of said icon reflects the type of incoming conferencing correspondence.

5. The method as set forth in claim 3, wherein said morphing is determined by weighting input from said user of said computer system, input from processes on said computer system, activities handled by said user of said computer system, or any combination thereof.

6. The method as set forth in claim 1, wherein said notification format includes at least part of content of said incoming conferencing correspondence.

7. The method as set forth in claim 1, further comprising delaying said step of presenting said incoming conferencing correspondence.

8. The method as set forth in claim 7, wherein said delaying is determined by weighting input set by said user of said computer system, input from processes on said computer system, activities handled by said user of said computer system, or any combination thereof.

* * * * *